US008639662B2

(12) United States Patent
Chandhok et al.

(10) Patent No.: US 8,639,662 B2
(45) Date of Patent: *Jan. 28, 2014

(54) METHODS AND APPARATUS FOR CONTENT BASED NOTIFICATION USING HIERARCHICAL GROUPS

(75) Inventors: Ravinder Paul Chandhok, Poway, CA (US); An Mei Chen, San Diego, CA (US); Bruce E Collins, San Diego, CA (US); Gordon Kent Walker, Poway, CA (US); Paul E Jacobs, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,166

(22) Filed: Sep. 13, 2012

(65) Prior Publication Data

US 2013/0007172 A1  Jan. 3, 2013

Related U.S. Application Data

(63) Continuation of application No. 11/373,613, filed on Mar. 9, 2006, now Pat. No. 8,301,598.

(60) Provisional application No. 60/660,610, filed on Mar. 10, 2005.

(51) Int. Cl.
*G06F 7/00* (2006.01)
*G06F 17/30* (2006.01)

(52) U.S. Cl.
USPC ............................ 707/628; 707/769; 707/803

(58) Field of Classification Search
USPC ........................ 707/628, 769, 803
See application file for complete search history.

(56) References Cited

U.S. PATENT DOCUMENTS

| 6,167,448 A * | 12/2000 | Hemphill et al. ............. 709/224 |
| 6,263,360 B1 * | 7/2001 | Arnold et al. ................. 709/203 |
| 6,708,291 B1 * | 3/2004 | Kidder ............................ 714/39 |
| 6,754,277 B1 * | 6/2004 | Heinzelman et al. ..... 375/240.27 |
| 6,883,137 B1 * | 4/2005 | Girardot et al. ............... 715/242 |
| 8,301,598 B2 | 10/2012 | Chandhok et al. |
| 2003/0097485 A1 * | 5/2003 | Horvitz et al. ................ 709/313 |
| 2003/0135553 A1 * | 7/2003 | Pendakur ...................... 709/205 |
| 2004/0019667 A1 * | 1/2004 | Slemmer et al. ............. 709/223 |
| 2004/0213283 A1 * | 10/2004 | Ohkubo et al. ............... 370/462 |
| 2005/0028219 A1 * | 2/2005 | Atzmon et al. ............... 725/116 |
| 2005/0138365 A1 * | 6/2005 | Bellipady et al. ............. 713/158 |

OTHER PUBLICATIONS

Bird et al.: UK Pub. No. GB 2,350,758 A.*
Bhandarkar et al., "Semantic Communication for Distibuted Information Coordination," The Proceedings fo the 1998 iEEE Conference on Information Technology, 1998.
Cannataro, et al., "Semantic Lossy Compression of XML Data," In Knowledge Representation Meets Databases, 2001.
Schumacher et al, "Indeterminate-length quantum coding," The America Phsyical Society, 2001.

* cited by examiner

*Primary Examiner* — Kuen Lu
(74) *Attorney, Agent, or Firm* — John J. Ketchum

(57) ABSTRACT

Methods and apparatus for content based notification using hierarchical groups. In an aspect, a method is provided that operates to provide an event notification. The method includes maintaining an event description dictionary comprising one or more event descriptors, and associating content with a selected event descriptor. The method also includes compressing the selected event descriptor to generate a compressed event descriptor, and transmitting the compressed event descriptor on a notification channel.

20 Claims, 7 Drawing Sheets

| Event | Number Type |
|---|---|
| NEWS | 1.0.0.0 |
| NEWS.STOCKS.DJIA | 1.1.1.0 |
| NEWS.LOCAL.SANDIEGO | 1.2.1.0 |
| ENTERTAINMENT.TV | 2.1.0.0 |
| ENTERTAINMENT.MOVIES | 2.2.0.0 |

FIG. 3

METHODS AND APPARATUS FOR CONTENT BASED NOTIFICATION USING HIERARCHICAL GROUPS

CLAIM OF PRIORITY UNDER 35 U.S.C. §119

This application is a continuation of U.S. application Ser. No. 11/373,613 entitled "METHOD AND APPARATUS FOR CONTENT BASED NOTIFICATION USING HIERARCHICAL GROUPS" filed Mar. 9, 2006, which claims priority to U.S. Provisional Application Ser. No. 60/660,610 entitled "METHOD AND APPARATUS FOR CONTENT BASED NOTIFICATION USING HIERARCHICAL GROUPS" filed Mar. 10, 2005. The content of each of these applications is hereby incorporated by reference herein in its entirety for all purposes.

BACKGROUND

1. Field

The present application relates generally to the operation of content distribution systems, and more particularly, to methods and apparatus for content based notification using hierarchical groups.

2. Background

Data networks, such as wireless communication networks, have to trade off between services customized for a single terminal and services provided to a large number of terminals. For example, the distribution of content (data) to a large number of terminals (subscribers) is a complicated problem. Therefore, it is very important for network administrators, content retailers, and service providers to have a way that allows networked devices to easily and efficiently receive content and/or other network services.

In current content delivery/media distribution systems where large amounts of content are delivered, it would be advantageous to be able to notify users of certain events related to content of interest. For example, a baseball fan might be interested in particular highlights like scoring plays, or a stockbroker might be interested in certain market events. Such a notification should require minimal device power so that it is suitable for use in wireless distribution systems. Unfortunately, current notification systems deliver messages having large payloads. These systems are not designed to conserve device power, and so are not suitable for use in wireless network applications.

Therefore, what is needed is an efficient system that operates to notify users of content of interest in such a way as to conserve device power.

SUMMARY

In one or more embodiments, a notification system, comprising methods and apparatus, is provided that operates to provide an efficient mechanism to notify devices on a network when desired content is available.

In an aspect, a method is provided that operates to provide an event notification. The method comprises maintaining an event description dictionary comprising one or more event descriptors, and associating content with a selected event descriptor. The method also comprises compressing the selected event descriptor to generate a compressed event descriptor, and transmitting the compressed event descriptor on a notification channel.

In another aspect, an apparatus is provided that operates to provide an event notification. The apparatus comprises an event description dictionary comprising one or more event descriptors, and processing logic configured to associate content with a selected event descriptor. The apparatus also comprises compression logic configured to compress the selected event descriptor to generate a compressed event descriptor, and transmitting logic configured to transmit the compressed event descriptor on a notification channel.

In another aspect, an apparatus is provided that operates to provide an event notification. The apparatus comprises means for maintaining an event description dictionary comprising one or more event descriptors, and means for associating content with a selected event descriptor. The apparatus also comprises means for compressing the selected event descriptor to generate a compressed event descriptor, and means for transmitting the compressed event descriptor on a notification channel.

In another aspect, a computer-readable medium is provided that has a computer program, which when executed by at least one processor, operates to provide an event notification. The computer program comprises instructions for maintaining an event description dictionary comprising one or more event descriptors, and instructions for associating content with a selected event descriptor. The computer program also comprises instructions for compressing the selected event descriptor to generate a compressed event descriptor, and instructions for transmitting the compressed event descriptor on a notification channel.

In another aspect, at least one processor is provided that is configured to perform a method for providing an event notification. The method comprises maintaining an event description dictionary comprising one or more event descriptors, and associating content with a selected event descriptor. The method also comprises compressing the selected event descriptor to generate a compressed event descriptor, and transmitting the compressed event descriptor on a notification channel.

In another aspect, a method is provided that operates to provide an event notification. The method comprises maintaining an event description dictionary comprising one or more event descriptors, and identifying a selected event descriptor. The method also comprises receiving a compressed event descriptor on a notification channel, and determining whether the compressed event descriptor matches the selected event descriptor.

In another aspect, an apparatus is provided that operates to provide an event notification. The apparatus comprises an event description dictionary comprising one or more event descriptors, and receiving logic configured to receive a compressed event descriptor on a notification channel. The apparatus also comprises client logic configured to identify a selected event descriptor, and to determine whether the selected event descriptor matches the compressed event descriptor.

In another aspect, an apparatus is provided that operates to provide an event notification. The apparatus comprises means for maintaining an event description dictionary comprising one or more event descriptors, and means for identifying a selected event descriptor. The apparatus also comprises means for receiving a compressed event descriptor on a notification channel, and means for determining whether the selected event descriptor matches the compressed event descriptor.

In another aspect, a computer-readable medium is provided that has a computer program, which when executed by at least one processor, operates to provide an event notification. The computer program comprises instructions for maintaining an event description dictionary comprising one or more event descriptors, and instructions for identifying a selected event descriptor. The computer program also comprises instructions for receiving a compressed event descriptor on a notification channel, and instructions for determining whether the selected event descriptor matches the compressed event descriptor.

In another aspect, at least one processor is provided that is configured to perform a method for providing an event notification. The method comprises maintaining an event description dictionary comprising one or more event descriptors, and identifying a selected event descriptor. The method also comprises receiving a compressed event descriptor on a notification channel, and determining whether the selected event descriptor matches the compressed event descriptor.

Other aspects of the embodiments will become apparent after review of the hereinafter set forth Brief Description of the Drawings, Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein:

FIG. 3 shows one embodiment of an event description dictionary for use in embodiments of a notification system;

DESCRIPTION

In one or more embodiments, a notification system is provided that operates to efficiently notify devices on a network when events of interest are available. For example, the system operates to notify devices when selected content is available on the network. The system is especially well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

Figure 1:
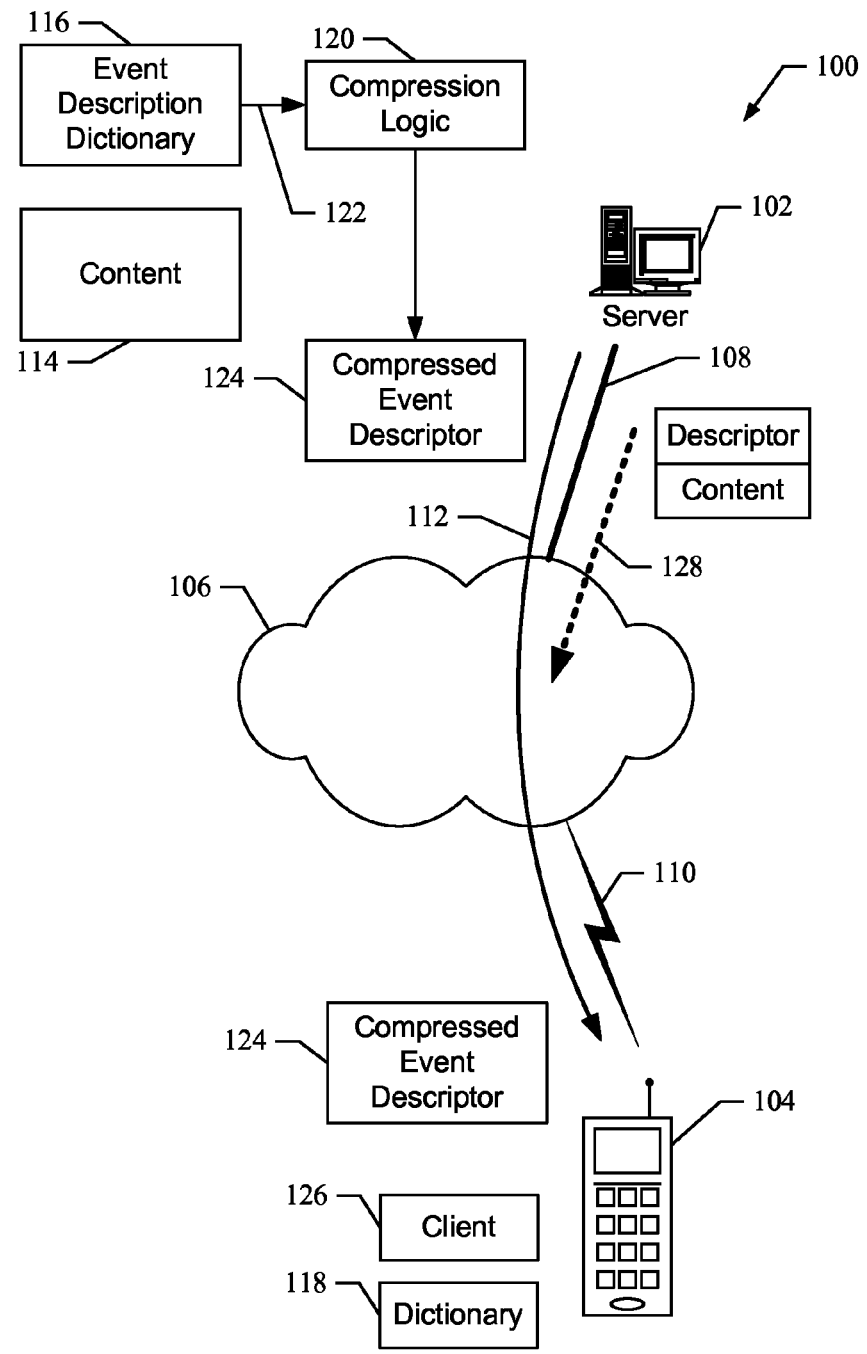
FIG. 1 shows a network that comprises one embodiment of a notification system.

FIG. 1 shows a network 100 that comprises one embodiment of a notification system. The network 100 comprises a server 102 that is in communication with a data network 106. In one embodiment, the server 102 operates to communicate with the network 106 using any type of communication link 108. The network 106 may be any type of wired and/or wireless network. The network 106 communicates with a device 104 using any suitable type of wireless communication link 110. The server 102 operates to transmit content and/or services to the device 104. Although only one device is shown, the system is suitable for use with any number and/or types of devices.

In one embodiment, the server 102 communicates with devices on the network 106 using a notification channel 112. For example, the notification channel 112 comprises any suitable type of overhead channel that devices on the network can monitor to receive short information messages.

The server 102 also comprises content 114 and an event description dictionary 116. The content 114 comprises any type of content, such as multimedia content, scripts, video clips, programs, data, or any other type of event, content, or service that the server 102 makes available to devices on the network 106.

In one embodiment, the event description dictionary 116 comprises event descriptors that characterize or describe the content 114. For example, in one embodiment, the event descriptors comprise a hierarchical representation of the content 114 by subject matter. A more detailed description of the event description dictionary 116 is provided in another section of this document.

In one embodiment, the event description dictionary 116 is distributed to devices on the network 106 so that each device has a local copy of the dictionary. For example, the dictionary 116 may be distributed over the network 106 in a transmission from the server 102, distributed in an out-of-band transmission, or installed on devices during manufacture. For example, the dictionary 116 is distributed to the device 104, as shown at 118. In one embodiment, the event description dictionary 116 is periodically updated and a new version of the dictionary 116 is distributed to the devices on the network 106. In one embodiment, an event descriptor is generated to indicate that a new version of the dictionary 116 is available.

The server 102 also comprises compression logic 120 that operates to receive an event descriptor 122 from the dictionary 116 and produce a compressed event descriptor 124. In one embodiment, the compression logic 120 operates to perform compression, truncation, hashing, encryption, encoding, or any other process to produce the compressed event descriptor 124.

The device 104 comprises a client 126, which in one embodiment, operates to monitor the notification channel 112 to receive any messages that may be of interest to the device 104. For example, a content event may be received that comprises a compressed event descriptor that describes content that is or will be available on the network 106. Thus, the client 124 operates to process information on the notification channel 112 and determine if any content events are received which may be of interest to the device and/or device user. When a content event of interest is received, the client 124 operates to determine any functions that need to be performed and/or provides any type of notification to the device user.

During operation of one embodiment of the notification system, content 114 is associated (or marked) with one or more selected event descriptors from the event dictionary 116. The selected event descriptor(s) is compressed into a compact representation by the compression logic 120 to form a compressed event descriptor. In one embodiment, all or the most significant part of the event descriptor is compressed by the compression logic 120. The compressed event descriptor is transmitted on the notification channel 112 to devices on the network 106. In one embodiment, all or any portion of the selected event descriptor or the compressed event descriptor is combined with the content it describes and delivered through a dedicated channel 128. In one embodiment, information about the dedicated channel 128 (i.e., access information) is also provided on the notification channel 112 along with the compressed event descriptor.

The client 126 monitors the notification channel 112 and operates to determine if a compressed event descriptor is received that is associated with a possibly interesting event. For example, the device user may have indicated or pre-selected events which are of interest by using the local copy of the dictionary 118. The client 126 operates to determine if a compressed event descriptor received on the notification channel 112 matches a pre-selected event of interest. In one embodiment, the client 126 operates to uncompress the compressed event descriptor to determine if it is associated with a pre-selected event of interest.

If a received event descriptor matches a pre-selected event, the client 126 may generate a notification to the device user, or may wake up (power on selected circuitry) the device 104 to receive more information about the content or event on the dedicated channel 128. In one embodiment, the device 104 may in fact be able to perform some function with just the information provided over the notification channel 112. In any case, the client 126 may take any type of action, like displaying a message to the user, or offering to tune the device 104 to a particular channel (i.e., the dedicated channel 128) to receive content.

Thus, in one or more embodiments of a notification system, a server operates to perform one or more of the following functions.

1. Maintain a dictionary of event descriptors.
2. Distribute the dictionary to devices on a network.
3. Associate (mark) selected content with one or more event descriptors.
4. Compress the event descriptor(s) to produce a compressed event descriptor.
5. Transmit the compressed event descriptor over a notification channel.
6. Transmit the selected content and the event descriptor over a dedicated channel.

In one or more embodiments of a notification system, a device operates to perform one or more of the following functions.

1. Receive and maintain a dictionary of event descriptors.
2. Determine events of interests (i.e., those events in the dictionary selected by a device user to be of interest).
3. Received a compressed event descriptor over a notification channel.
4. Determine if the compressed event descriptor is describing an event of interest (i.e., by comparing it to the pre-selected events of interest)
5. If the event is of interest, take additional action (i.e., provide a notification or wake up and tune to a selected dedicated channel to receive content).

Therefore, embodiments of the notification system operate to provide an efficient way to notify devices about selected content events of interest. For example, a device need only monitor the notification channel to determine if events of interest are available, thereby conserving device power. It should be noted that the network 100 is just one implementation and that other implementations are possible within the scope of the embodiments.

Figure 2:
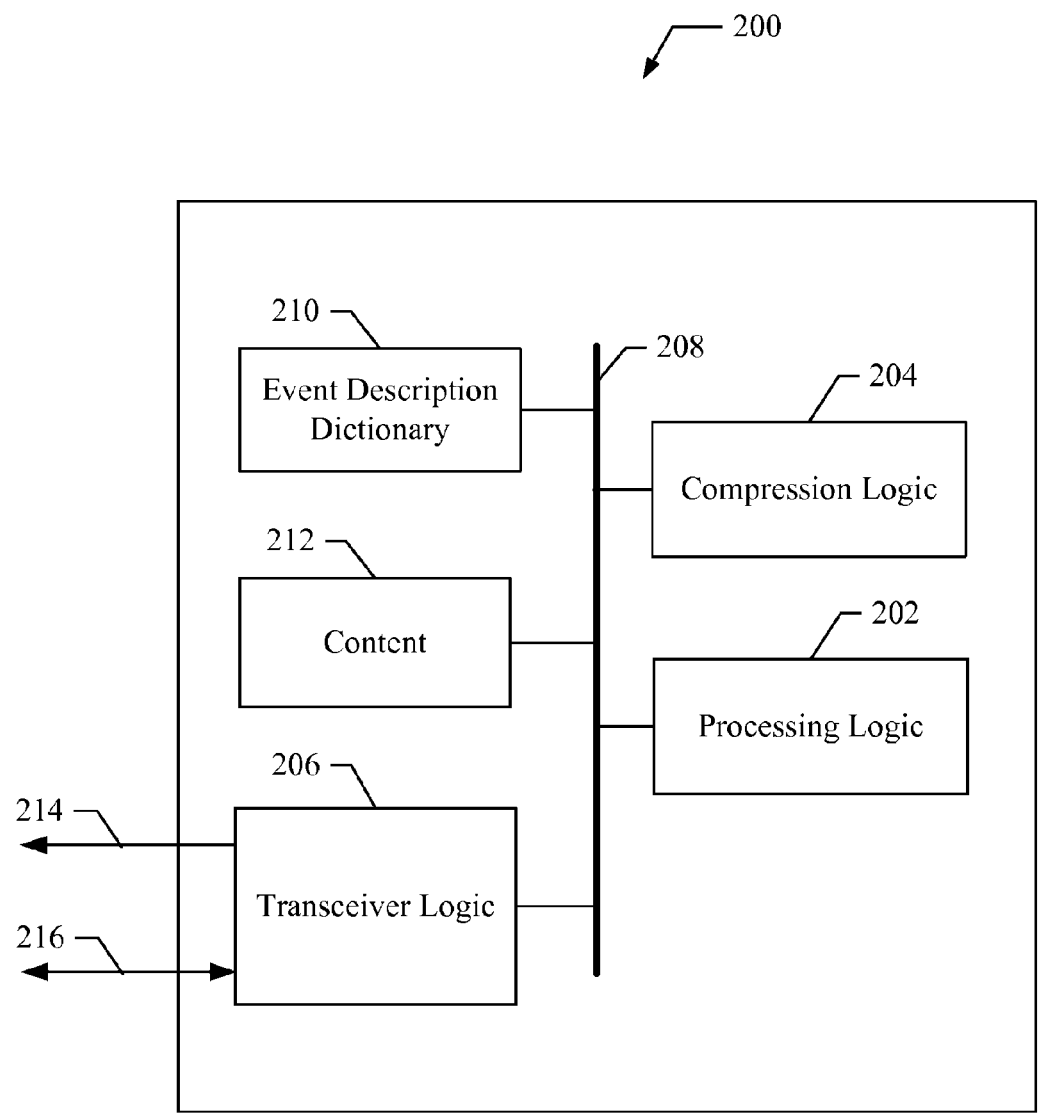
FIG. 2 shows one embodiment of a server for use in embodiments of a notification system.

FIG. 2 shows one embodiment of a server 200 for use in embodiments of a notification system. For example, the server 200 is suitable for use as the server 102 shown in FIG. 1. The server 200 comprises processing logic 202, compression logic 204, and transceiver logic 206 that are all coupled to a data bus 208. The server 200 also comprises an event description dictionary 210 and content 212 that are also coupled to the data bus 208. It should be noted that the server 200 represents just one implementation and that other implementations are possible within the scope of the embodiments.

In one or more embodiments, the processing logic 202 comprises a CPU, processor, gate array, hardware logic, memory elements, virtual machine, software, and/or any combination of hardware and software. Thus, the processing logic 202 generally comprises logic to execute machine readable instructions and to control one or more other functional elements of the server 200 via the internal data bus 208.

The compression logic 204 comprises hardware, software, and/or any combination of hardware and software. The compression logic 204 operates to compress event descriptors that are part of the event description dictionary 210. In one embodiment, the compression logic 204 operates to truncate an event descriptor to its most significant portion. Additionally, the compression logic 204 operates to compress, hash, encode, encrypt and/or otherwise perform any other process to compress event descriptors.

The transceiver logic 206 comprises hardware, software, and/or any combination of hardware and software that operate to provide logic to receive and logic to transmit information over a network in order to provide the following functions. In one embodiment, the transceiver logic comprises logic configured to provide a notification channel 214 which with to communicate with devices over a network. For example, the notification channel 214 may be the notification channel 112 shown in FIG. 1 and comprise any type of wired and/or wireless communication link that operates to provide short information messages to devices on a network.

The transceiver logic 206 also comprises logic configured to provide one or more dedicated communication channels 216. The dedicated communication channels 216 comprise any suitable type of communication technology that operates to provide communications over a network. In one embodiment, the communication channel 216 comprises a dedicated network channel that allows the server 200 to transmit content and/or other services to devices over a wireless communication network. For example, the dedicated communication channel 216 may be the dedicated communication channel 128 shown in FIG. 1.

The content 212 comprises any type of content or service, such as multimedia content, clips, programs, scripts, support services, or any other type of content, service, or event. In one embodiment, the server 200 operates to transmit selected content to devices on a network using the transceiver logic 206 and communication channel 216.

The event description dictionary 210 comprises one or more event descriptors that describe or categorize the content 212. For example, in one embodiment, the processing logic 202 maintains the dictionary 210 which comprises one or more event descriptors that have a hierarchical structure. Such a hierarchical structure allows the event descriptors to be compactly encoded into a numerical representation. Furthermore, such a representation maybe divided into multiple portions or levels, where higher levels can be used to compactly identify particular classes or sub-classes of content. A more detailed description of the event dictionary 210 is provided in another section of this document.

During operation of one or more embodiments, the server 200 operates to efficiently notify devices on a network about current or upcoming content events. In one embodiment, the processing logic 202 operates to associate (or mark) selected content 212 with selected event descriptors from the event description dictionary 210. The processing logic 202 controls the compression logic 204 to compress a selected event descriptor to produce a compressed event descriptor. For example, the compressed event descriptor may the compressed event descriptor 124 shown in FIG. 1.

The processing logic 202 then controls the transceiver logic 206 to transmit the compressed event descriptor over the notification channel 214. For example, the compressed event descriptor describes what may be referred to as a content event. Devices listening on the notification channel 214 can receive the compressed descriptor and decide whether the content described by the event descriptor is of any interest. In one embodiment, the processing logic 202 obtains the selected content 212 and controls the transceiver logic 206 to transmit the content 212 and its associated event descriptor over the dedicated communication channel 216. In one embodiment, the uncompressed event descriptor, the compressed event descriptor, and/or some portion of the event descriptor is grouped with the content and transmitted over the dedicated channel 216 to one or more devices.

A device listening on the notification channel 214 operates to decide if a received content event describes content of interest. For example, the content may be of interest to the device user. If this is the case, the device may tune to the dedicated channel 216 to receive the content, or provide some other function, such as notify the device user.

In one embodiment, the notification system comprises a computer program having one or more program instructions ("program instructions") stored on a computer-readable medium, which when executed by at least one processor, for instance, the processing logic 202, provides the functions described herein. For example, the program instructions may be loaded into the server 200 from a computer-readable medium, such as a floppy disk, CDROM, memory card, FLASH memory device, RAM, ROM, or any other type of memory device or computer-readable medium that interfaces to the server 200. In another embodiment, the program instructions may be downloaded into the server 200 from an external device or network resource. The program instructions, when executed by the processing logic 202, provide embodiments of a notification system as described herein.

As a result, embodiments of the notification system operate to transmit compressed event descriptors on a notification channel to allow devices to determine further action upon receipt of the descriptors. Thus, embodiments of the notification system operate to provide an efficient and flexible notification system because devices only need to listen on the notification channel to determine if there are any events of interest. This allows devices to conserve power since a device may not need to be fully powered up until content events of interest are detected.

FIG. 3 shows one embodiment of an event description dictionary 300 for use in embodiments of a notification system. The dictionary 300 comprises event descriptors 302 and number types 304. It should be noted that the dictionary 300 represents just one implementation and that other implementations are possible within the scope of the embodiments.

The event descriptors 302 provide a hierarchical representation of events by subject matter. For example, events 306, 308, and 310 represent a hierarchy of events related to "News." The events 312 and 314 represent a hierarchy of events related to "Entertainment."

Associated with each event descriptor in the dictionary 300 is a number type 304. For example, the number type associated with event 306 is "1.0.0.0", which allows the event to be compactly encoded numerically. In one embodiment, there is no particular limit to the depth of the hierarchy. However, items that are very specific may take more bits to encode than a general category. It should be noted that any numerical value may be assigned to each event or any group of events. Thus, the event description dictionary 300 allows any content or event to be compactly described by the event descriptors 302.

Figure 4:
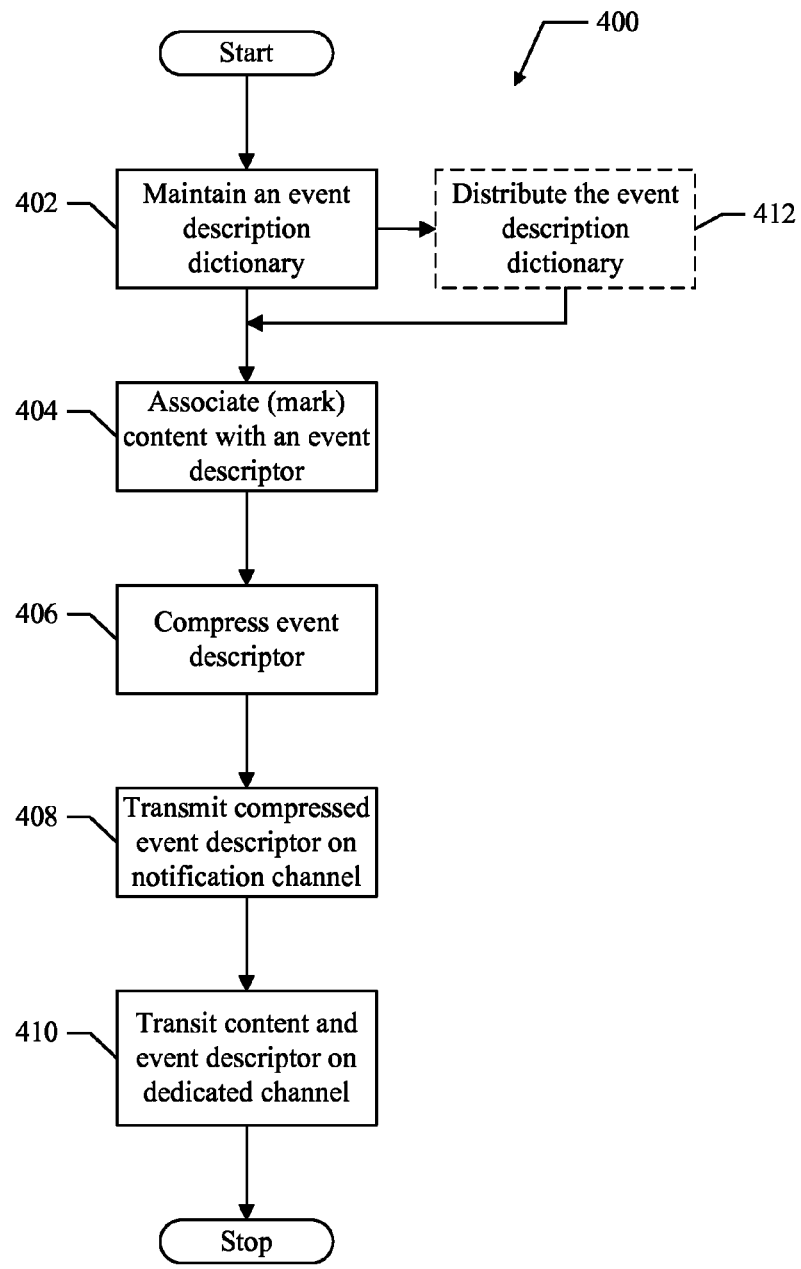
FIG. 4 shows one embodiment of a method for operating a server for use in embodiments of a notification system.

FIG. 4 shows one embodiment of a method 400 for operating a server for use in embodiments of a notification system. For clarity, the method 400 is described herein with reference to the server 200 shown in FIG. 2. For example, in one embodiment, the processing logic 202 executes machine-readable instructions to perform the functions described below.

At block 402, an event description dictionary is maintained that describes events associated with a network. For example, the processing logic 202 maintains the event description dictionary 210. In one embodiment, the event description dictionary is formatted as shown in FIG. 3 and comprises a hierarchical representation of content. It should be noted that the method 400 comprises an optional function as shown at 412, wherein the event description dictionary is distributed to devices on a network. For example, the transceiver logic 206 operates to transmit the event description dictionary 210 over a network to devices.

At block 404, content is marked or associated with an event descriptor. For example, the processing logic 202 operates to associate selected content or other events with one or more event descriptors from the event description dictionary 210. For example, content is marked or associated with descriptors in the dictionary 210 using any suitable technique.

At block 406, an event descriptor associated with selected content is compressed. For example, in one embodiment, the compression logic 204 operates to compress the event descriptor as described above. In one embodiment, the compression logic 204 operates to use any suitable compression technique to compress the event descriptor. For example, in one embodiment, the event descriptor is truncated to a selected level in the hierarchy, or is encoded, encrypted, or otherwise compressed. In another embodiment, a numerical value associated with the event descriptor is hashed or encoded to produce a compact representation of the event descriptor.

At block 408, the compressed event descriptor is transmitted over a notification channel. For example, the processing logic 202 operates to control the transceiver logic 206 to transmit the compressed event descriptor over the notification channel 214. In one embodiment, the event descriptor may be split into separate portions (or levels) and delivered over the network in separate communications to allow for efficient use of the network. For example, in one embodiment the server 200 may send only the two (2) most significant hierarchical levels of an event descriptor in the notification channel, and the rest of the event descriptor is sent in a dedicated channel. In one embodiment, other information may also be sent in the notification channel, such information describing how to access a dedicated channel.

At block 410, the content and the event descriptor are transmitted over a dedicated channel. For example, the processing logic 202 operates to control the transceiver logic 206 to transmit the selected content and the event descriptor over the dedicated channel 216. In one embodiment, a portion of the event descriptor is transmitted with the content. In another embodiment, a compressed portion of the event descriptor is transmitted with the content. Thus, any version of the event descriptor may be transmitted with the content over the dedicated channel 216.

Thus, the method 400 operates to provide one embodiment of a notification system. It should be noted that the method 400 represents just one implementation and that the described functions may be combined, added to, changed, deleted, or other otherwise modified within the scope of the embodiments.

Figure 5:
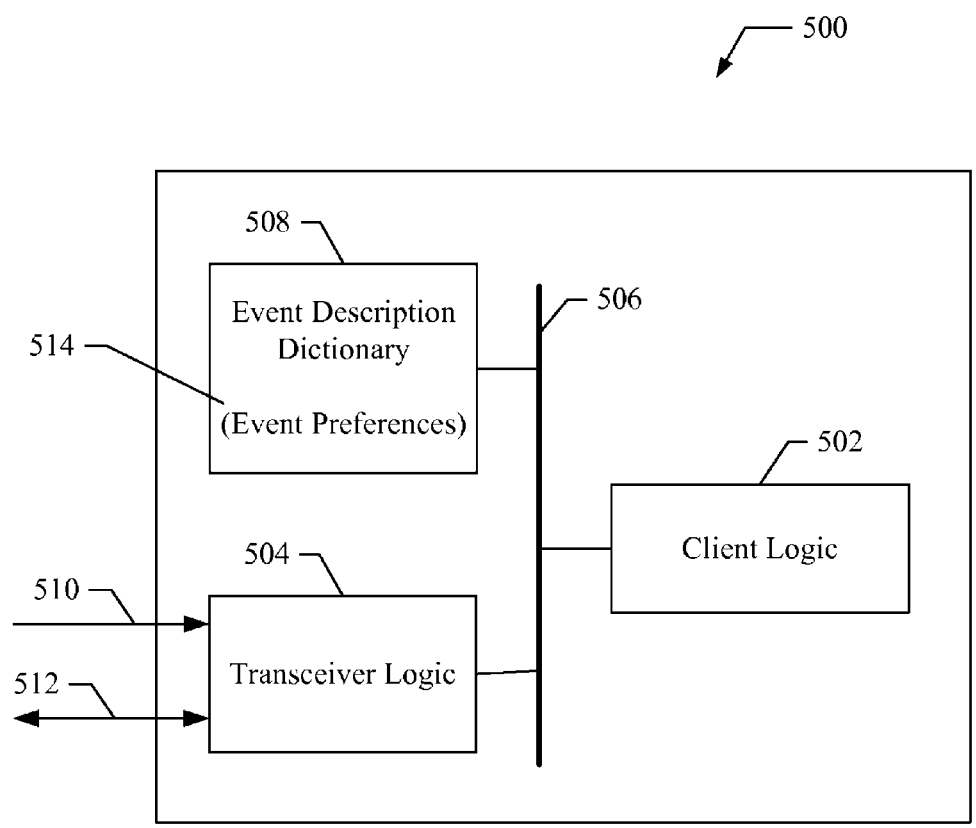
FIG. 5 shows one embodiment of a device suitable for use in embodiments of a notification system.

FIG. 5 shows one embodiment of a device 500 suitable for use in embodiments of a notification system. For example, the device 500 is suitable for use as the device 104 shown in FIG. 1. The device 500 comprises a client 502 and transceiver logic 504 which are coupled to a data bus 506. The device 500 also comprises an event description dictionary 508, which is also coupled to the data bus 506.

The transceiver logic 504 comprises hardware, software, and/or any combination of hardware and software that operate to provide logic to receive and logic to transmit information over a network to provide the following functions. In one embodiment, the transceiver logic comprises logic configured to receive a notification channel 510 with which to listen to communications over a network. For example, the notification channel 510 may be any type of wired and/or wireless overhead communication channel that allows short information messages to be received from a network.

The transceiver logic 504 also comprises logic configured to receive one or more dedicated communication channels 512. The dedicated communication channel 512 comprises any suitable type of communication technology that operates to provide communications over a network. In one embodiment, the communication channel 512 comprises a dedicated network channel that allows the device 500 to receive content and/or other services transmitted over a wireless network.

The event description dictionary 508 comprises one or more event descriptors that describe or categorize content and/or events. For example, in one embodiment, the dictionary 508 comprises event descriptors that follow a hierarchical model. Such a hierarchical model allows events to be compactly encoded into a numerical representation. Furthermore, such a representation maybe divided into multiple portions or levels, where higher levels can be used to compactly identify particular classes or sub-classes of content. In one embodiment, the event description dictionary 508 is formatted as the dictionary 300 shown in FIG. 3. In one embodiment, the client logic 502 operates to maintain the event dictionary 508. In another embodiment, the event dictionary 508 is received by the transceiver logic 504 in a network transmission.

In one embodiment, the event description dictionary 508 comprises event preferences 514. The event preferences 514 identify selected events that are desirable or of interest to the device user. For example, in one embodiment, the client logic 502 provides an interactive user interface that allows the device user to select or identify desirable events of interest from the event dictionary 508. The selections of the device user are stored as the event preferences 514. In another embodiment, the event preferences 514 may be determined using any other technique. For example, the device user may identify desired events to a content server, which then downloads the event preferences 514 to the device 500.

The client logic 502 comprises hardware, software and/or any combination of hardware and software. The client logic 502 operates to monitor the notification channel 510 to listen for content events of interest. When a content event of interest is detected, the client logic 502 operates to take some action, such as notifying the device user, or tuning to a dedicated channel (i.e., channel 512) to receive selected content.

For example, during operation of one embodiment of a notification system, the client logic 502 operates to control the transceiver logic 504 to listen on the notification channel 510. When a content event is received on the notification channel, the client logic 502 determines if the content event describes an event of interest. For example, in one embodiment, the client logic 502 operates to uncompress a received compressed event descriptor to determine the described event. That event is then compared to the event preferences 514 to determine if it is an event of interest. For example, the event preferences comprise a pre-selected list of desired events. The client logic 502 operates to compare the list of pre-selected events of interest to the received event descriptor. If there is a match, then the received content event is determined to be an event of interest. The client logic 502 then operates to perform any action that may be necessary, such as notifying the device user, or tuning to a dedicated channel to receive content described by the event descriptor.

In one embodiment, the notification system comprises a computer program having one or more program instructions ("program instructions") stored on a computer-readable medium, which when executed by at least one processor, for instance, the client logic 502, provides the functions described herein. For example, the program instructions may be loaded into the device 500 from a computer-readable medium, such as a floppy disk, CDROM, memory card, FLASH memory device, RAM, ROM, or any other type of memory device or computer-readable medium that interfaces to the device 500. In another embodiment, the instructions may be downloaded into the device 500 from an external device or network resource. The program instructions, when executed by the client logic 502, provide embodiments of a notification system as described herein.

As a result, embodiments of the notification system operate to listen to a notification channel to receive content events. When an event of interest is detected, the system operates to take action, such as notifying the device user or tuning to a dedicated channel. Thus, embodiments of the notification system operate to provide an efficient and flexible system because a device need only take action when events of interest are detected on the notification channel.

Figure 6:
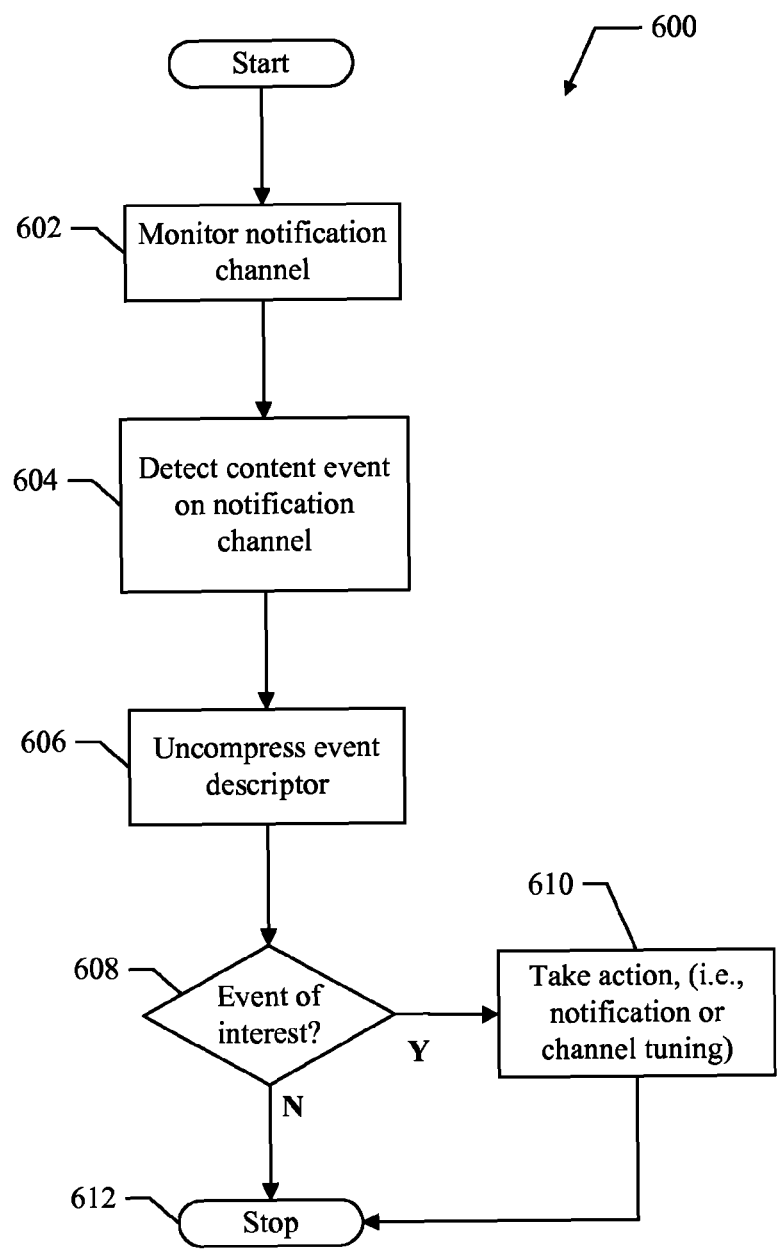
FIG. 6 shows one embodiment of a method for operating a device in embodiments of a notification system.

FIG. 6 shows one embodiment of a method 600 for operating a device in embodiments of a notification system. For clarity, the method 600 is described herein with reference to the device 500 shown in FIG. 5. For example, in one embodiment, the client logic 502 executes machine-readable instructions to perform the functions described below.

At block 602, a notification channel is monitored for content event. For example, the client logic 502 controls the transceiver logic 504 to monitor the notification channel 510 and pass any received information to the client logic 502.

At block 604, a content event comprising an event descriptor is detected on the notification channel. For example, the transceiver logic 504 receives the content event on the notification channel and passes it to the client logic 502. In one embodiment, the content event comprises a compressed event descriptor that has been compressed as the result of one or more compression techniques described above.

At block 606, the compressed event descriptor is uncompressed. For example, in one embodiment, the client logic 502 operates to uncompress the received event descriptor if necessary. For example, the received compressed event descriptor may be a hashed value, and the client logic 502 operates to reverse the hashing process to uncompress the compressed event descriptor.

At block 608, a test is performed to determine if the event descriptor describes an event of interest. For example, in one embodiment, the client logic 502 operates to compare the event descriptor to the event preferences 514. If a match is detected, the event descriptor describes an event of interest and the method proceeds to block 610. If no match is found, then the method ends at block 612. In one embodiment, the client logic 502 provides a user interface that allows a device user to input the event preferences 514. In another embodiment, the event preferences 514 are downloaded to the device 500 from a network entity, such as a content distribution server.

At block 610, action is taken as the result of detecting an event of interest. For example, in one embodiment, the client logic 502 operates to notify the user that an event of interest has been detected. In another embodiment, the client logic 502 operates to control the transceiver logic 504 to tune to the dedicated channel 512 to receive selected content.

Thus, the method 600 operates to provide one embodiment of a notification system. It should be noted that the method 600 represents just one implementation and that the described functions may be combined, added to, changed, deleted, or other otherwise modified within the scope of the embodiments.

Figure 7:
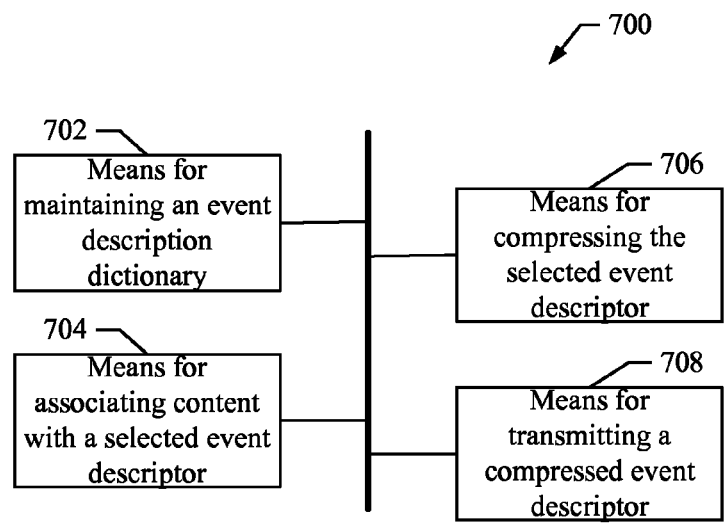
FIG. 7 shows one embodiment of a server for use in embodiments of a notification system.

FIG. 7 shows one embodiment of a server 700 for use in embodiments of a notification system. The server 700 comprises means for maintaining 702, means for associating 704, means compressing 706 and means for transmitting 708.

In one embodiment, the means for maintaining 702 comprises hardware and/or software and operates to maintain an event description dictionary. For example, the event description dictionary may be the dictionary 300 shown in FIG. 3. The means 702 also comprises means for distributing the event description dictionary to devices on a network.

In one embodiment, the means for associating 704 comprises hardware and/or software and operates to associate event descriptors in the event description dictionary with content and/or services.

In one embodiment, the means for compressing 706 comprises hardware and/or software and operates to compress event descriptors. For example, an event descriptor may be hashed, truncated, encoded, or encrypted during the compression process.

In one embodiment, the means for transmitting 708 comprises hardware and/or software and operates to transmit event descriptors. For example, an event descriptor may be compressed and transmitted over a notification channel. Thus, the server 700 operates to provide one embodiment of a notification system.

Figure 8:
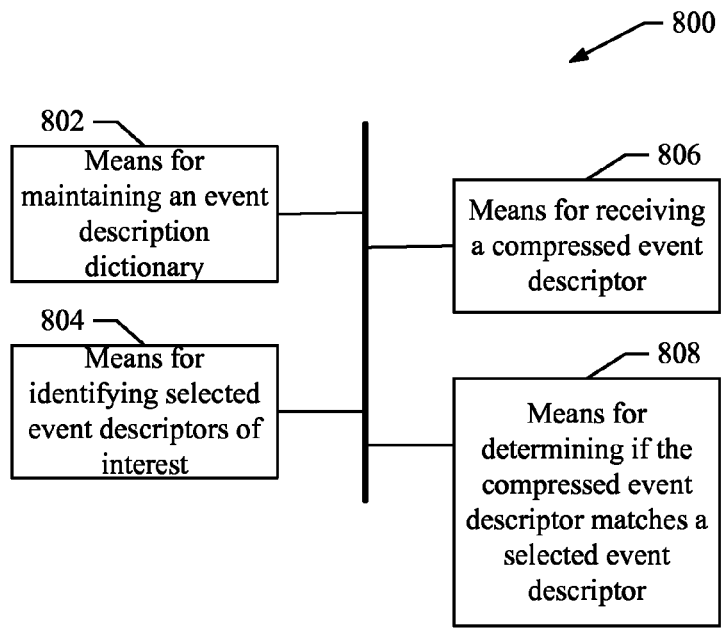
FIG. 8 shows one embodiment of a device for use in embodiments of a notification system.

FIG. 8 shows one embodiment of a device 800 for use in embodiments of a notification system. The device 800 comprises means for maintaining 802, means for identifying 804, means receiving 806 and means for determining 808.

In one embodiment, the means for maintaining 802 comprises hardware and/or software and operates to maintain an event description dictionary. For example, the event description dictionary may be the dictionary 300 shown in FIG. 3. In one embodiment, the means 802 comprises means for receiving the event description dictionary in a network transmission.

In one embodiment, the means for identifying 804 comprises hardware and/or software and operates to identify one or more selected event descriptors that are associated with content and/or services of interest to a device user.

In one embodiment, the means for receiving 806 comprises hardware and/or software and operates to receive one or more compressed event descriptors on a notification channel. For example, a compressed event descriptor may be transmitted from a server over the notification channel to devices on a network.

In one embodiment, the means for determining 808 comprises hardware and/or software and operates to determine if a received compressed event descriptor matches one or more selected event descriptors. For example, an event descriptor may be compressed and transmitted over a notification channel. When the compressed descriptor is received, the means for determining 808 operates to decompress the descriptor and determine if it matches a selected event descriptor. If a match occurs, a notification is generated or the device is tuned to a dedicated channel to receive content associated with the selected event descriptor. Thus, the device 800 operates to provide one embodiment of a notification system.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

Accordingly, while embodiments of a notification system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for providing an event notification, comprising:

maintaining an event description dictionary comprising one or more event descriptors;

associating content with a selected event descriptor, wherein the event descriptor does not include the content and is configured to at least describe or characterize the content;

splitting the event descriptor into a first portion and a second portion;

transmitting the first portion of the event descriptor on a notification channel to a client, the notification channel being an overhead channel that allows for transmission of short information messages, wherein the notification channel is not used for transmission of the content; and transmitting the content and the second portion of the event descriptor on a different channel distinct from the notification channel.

2. The method of claim 1, further comprising sending information describing how the second portion of the event descriptor and the content can be obtained on said different channel.

3. An apparatus for providing an event notification, comprising:

means for maintaining an event description dictionary comprising one or more event descriptors;

means for associating content with a selected event descriptor, wherein the event descriptor does not include the content and is configured to at least describe or characterize the content;

means for splitting the event descriptor into a first portion and a second portion;

means for transmitting the first portion of the event descriptor on a notification channel to a client, the notification channel being an overhead channel that allows for transmission of short information messages, wherein the notification channel is not used for transmission of the content; and means for transmitting the content and the second portion of the event descriptor on a different channel distinct from the notification channel.

4. The apparatus of claim 3, further comprising means for sending information describing how the second portion of the event descriptor and the content can be obtained on said different channel.

5. An apparatus for providing an event notification, comprising:

at least one processor configured to:

maintain an event description dictionary comprising one or more event descriptors;

associate content with a selected event descriptor, wherein the event descriptor does not include the content and is configured to at least describe or characterize the content;

split the event descriptor into a first portion and a second portion;

transmit the first portion of the event descriptor on a notification channel to a client, the notification channel being an overhead channel that allows for transmission of short information messages, wherein the notification channel is not used for transmission of the content; and transmit the content and the second portion of the event descriptor on a different channel distinct from the notification channel.

6. The apparatus of claim 5, wherein the at least one processor is further configured to send information describing how the second portion of the event descriptor and the content can be obtained on said different channel.

7. A non-transitory computer-readable medium for providing an event notification, the non-transitory computer-readable medium comprising code for:

maintaining an event description dictionary comprising one or more event descriptors;

associating content with a selected event descriptor, wherein the event descriptor does not include the content and is configured to at least describe or characterize the content;

splitting the event descriptor into a first portion and a second portion;

transmitting the first portion of the event descriptor on a notification channel to a client, the notification channel being an overhead channel that allows for transmission of short information messages, wherein the notification channel is not used for transmission of the content; and transmitting the content and the second portion of the event descriptor on a different channel distinct from the notification channel.

8. The non-transitory computer-readable medium of claim 7, further comprising code for sending information describing how the second portion of the event descriptor and the content can be obtained on said different channel.

9. A method for providing an event notification, comprising:

maintaining an event description dictionary comprising one or more event descriptors;

receiving a first event descriptor on a notification channel, the notification channel being an overhead channel that allows for short information messages to be received;

determining whether the first event descriptor is associated with an event descriptor of the one or more event descriptors; and receiving a second event descriptor and content associated with the event descriptor of the one or more event descriptors on a different channel distinct from the notification channel when the first event descriptor is associated with the event descriptor of the one or more event descriptors, wherein the first event descriptor does not include the content and is configured to at least describe or characterize the content, and wherein the notification channel is not used for receiving the content.

10. The method of claim 9, further comprising receiving information describing how to obtain the second event descriptor and the content on said different channel.

11. The method of claim 9, further comprising providing an indication that an event of interest associated with the event descriptor of the one or more event descriptors has been detected.

12. An apparatus for providing an event notification, comprising:

means for maintaining an event description dictionary comprising one or more event descriptors;

means for receiving a first event descriptor on a notification channel, the notification channel being an overhead channel that allows for short information messages to be received;

means for determining whether the first event descriptor is associated with an event descriptor of the one or more event descriptors; and means for receiving a second event descriptor and content associated with the event descriptor of the one or more event descriptors on a different channel distinct from the notification channel when the first event descriptor is associated with the event descriptor of the one or more event descriptors, wherein the first event descriptor does not include the content and is configured to at least describe or characterize the content, and wherein the notification channel is not used for receiving the content.

13. The apparatus of claim 12, further comprising means for receiving information describing how to obtain the second event descriptor and the content on said different channel.

14. The apparatus of claim 12, further comprising means for providing an indication that an event of interest associated with the event descriptor of the one or more event descriptors has been detected.

15. An apparatus for providing an event notification, comprising:
at least one processor configured to:
maintain an event description dictionary comprising one or more event descriptors;
receive a first event descriptor on a notification channel, the notification channel being an overhead channel that allows for short information messages to be received;
determine whether the first event descriptor is associated with an event descriptor of the one or more event descriptors; and
receive a second event descriptor and content associated with the event descriptor of the one or more event descriptors on a different channel distinct from the notification channel when the first event descriptor is associated with the event descriptor of the one or more event descriptors,
wherein the first event descriptor does not include the content and is configured to at least describe or characterize the content, and wherein the notification channel is not used for receiving the content.

16. The apparatus of claim 15, wherein the at least one processor is further configured to receive information describing how to obtain the second event descriptor and the content on said different channel.

17. The apparatus of claim 15, wherein the at least one processor is further configured to provide an indication that an event of interest associated with the event descriptor of the one or more event descriptors has been detected.

18. A non-transitory computer-readable medium for providing an event notification, the non-transitory computer-readable medium comprising code for:
maintaining an event description dictionary comprising one or more event descriptors;
receiving a first event descriptor on a notification channel, the notification channel being an overhead channel that allows for short information messages to be received;
determining whether the first event descriptor is associated with an event descriptor of the one or more event descriptors; and
receiving a second event descriptor and content associated with the event descriptor of the one or more event descriptors on a different channel distinct from the notification channel when the first event descriptor is associated with the event descriptor of the one or more event descriptors,
wherein the first event descriptor does not include the content and is configured to at least describe or characterize the content, and wherein the notification channel is not used for receiving the content.

19. The non-transitory computer-readable medium of claim 18, further comprising code for receiving information describing how to obtain the second event descriptor and the content on said different channel.

20. The non-transitory computer-readable medium of claim 18, further comprising code for providing an indication that an event of interest associated with the event descriptor of the one or more event descriptors has been detected.

* * * * *